United States Patent
Shen et al.

(10) Patent No.: US 9,792,188 B2
(45) Date of Patent: Oct. 17, 2017

(54) REMOTE CABLE ACCESS POINT RESET

(75) Inventors: Ming-Jye Shen, San Jose, CA (US);
Allen Miu, Fremont, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

(21) Appl. No.: 13/461,679

(22) Filed: May 1, 2012

(65) Prior Publication Data
US 2012/0278654 A1 Nov. 1, 2012

Related U.S. Application Data (60) Provisional application No. 61/481,203, filed on May 1, 2011.

(51) Int. Cl.
| | | |
|---|---|---|
| *G06F 11/20* | (2006.01) | |
| *G06F 11/07* | (2006.01) | |
| *H04L 12/24* | (2006.01) | |

(52) U.S. Cl.
CPC ...... *G06F 11/2005* (2013.01); *G06F 11/0748* (2013.01); *G06F 11/0793* (2013.01); *H04L 41/0672* (2013.01)

(58) Field of Classification Search
CPC ............. G06F 11/0748; G06F 11/0793; G06F 11/2005; G06F 11/2023; G06F 11/2025
See application file for complete search history.

(56) References Cited

U.S. PATENT DOCUMENTS

| | | |
|---|---|---|
| 4,176,356 A | 11/1979 | Foster |
| 4,193,077 A | 3/1980 | Greenberg |
| 4,253,193 A | 2/1981 | Kennard |
| 4,305,052 A | 12/1981 | Baril |
| 4,513,412 A | 4/1985 | Cox |
| 4,814,777 A | 3/1989 | Monser |

(Continued)

FOREIGN PATENT DOCUMENTS

| | | |
|---|---|---|
| CN | 1708162 | 12/2005 |
| CN | 1316862 | 10/2011 |

(Continued)

OTHER PUBLICATIONS

US 9,015,816, 04/2015, Sheu (withdrawn)

(Continued)

*Primary Examiner* — Benjamin Geib
(74) *Attorney, Agent, or Firm* — Lewis Roca Rothgerber Christie LLP (57) ABSTRACT

The system monitors a wireless device, detects when the device has failed or is not operating properly, and is able to remotely reset the device. The device may be reset remotely without a technician required to physically attend to the device. This out of band management allows for quicker, cheaper and more efficient handling of undesired states of a device, such as failure to operate. For a modem, the system may detect that the modem is not broadcasting a signal or is not communicating with the Internet or other network. The reset may be implemented through an access point in communication with the malfunctioning modem. For an access point, the system may detect that the access point is not communicating with a modem or another access point. The reset may be implemented by a neighboring access point or modem.

20 Claims, 6 Drawing Sheets

(56) References Cited

U.S. PATENT DOCUMENTS

| | | |
|---|---|---|
| 5,097,484 A | 3/1992 | Akaiwa |
| 5,173,711 A | 12/1992 | Takeuchi |
| 5,203,010 A | 4/1993 | Felix |
| 5,220,340 A | 6/1993 | Shafai |
| 5,373,548 A | 12/1994 | McCarthy |
| 5,507,035 A | 4/1996 | Bantz |
| 5,559,800 A | 9/1996 | Mousseau |
| 5,754,145 A | 5/1998 | Evans |
| 5,767,809 A | 6/1998 | Chuang |
| 5,802,312 A | 9/1998 | Lazaridis |
| 5,964,830 A | 10/1999 | Durett |
| 6,034,638 A | 3/2000 | Thiel |
| 6,094,177 A | 7/2000 | Yamamoto |
| 6,266,528 B1 | 7/2001 | Farzaneh |
| 6,292,153 B1 | 9/2001 | Aiello |
| 6,307,524 B1 | 10/2001 | Britain |
| 6,317,599 B1 | 11/2001 | Rappaport |
| 6,326,922 B1 | 12/2001 | Hegendoerfer |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,356,242 B1 | 3/2002 | Ploussios |
| 6,356,243 B1 | 3/2002 | Schneider |
| 6,356,905 B1 | 3/2002 | Gershman |
| 6,377,227 B1 | 4/2002 | Zhu |
| 6,392,610 B1 | 5/2002 | Braun |
| 6,404,386 B1 | 6/2002 | Proctor |
| 6,407,719 B1 | 6/2002 | Ohira |
| 6,442,507 B1 | 8/2002 | Skidmore |
| 6,445,688 B1 | 9/2002 | Garces |
| 6,493,679 B1 | 12/2002 | Rappaport |
| 6,498,589 B1 | 12/2002 | Horii |
| 6,499,006 B1 | 12/2002 | Rappaport |
| 6,507,321 B2 | 1/2003 | Oberschmidt |
| 6,625,454 B1 | 9/2003 | Rappaport |
| 6,674,459 B2 | 1/2004 | Ben-Shachar |
| 6,701,522 B1 | 3/2004 | Rubin |
| 6,725,281 B1 | 4/2004 | Zintel |
| 6,753,814 B2 | 6/2004 | Killen |
| 6,762,723 B2 | 7/2004 | Nallo |
| 6,772,331 B1 | 8/2004 | Hind et al. |
| 6,779,004 B1 | 8/2004 | Zintel |
| 6,807,577 B1 | 10/2004 | Gillespie |
| 6,819,287 B2 | 11/2004 | Sullivan |
| 6,876,280 B2 | 4/2005 | Nakano |
| 6,888,504 B2 | 5/2005 | Chiang |
| 6,888,893 B2 | 5/2005 | Li |
| 6,892,230 B1 | 5/2005 | Gu |
| 6,906,678 B2 | 6/2005 | Chen |
| 6,910,068 B2 | 6/2005 | Zintel |
| 6,924,768 B2 | 8/2005 | Wu |
| 6,931,429 B2 | 8/2005 | Gouge |
| 6,941,143 B2 | 9/2005 | Mathur |
| 6,947,727 B1 | 9/2005 | Brynielsson |
| 6,950,019 B2 | 9/2005 | Bellone |
| 6,950,523 B1 | 9/2005 | Brickell |
| 6,961,028 B2 | 11/2005 | Joy |
| 6,973,622 B1 | 12/2005 | Rappaport |
| 6,975,834 B1 | 12/2005 | Forster |
| 7,034,770 B2 | 4/2006 | Yang |
| 7,043,277 B1 | 5/2006 | Pfister |
| 7,043,633 B1 | 5/2006 | Fink et al. |
| 7,050,809 B2 | 5/2006 | Lim |
| 7,064,717 B2 | 6/2006 | Kaluzni |
| 7,085,814 B1 | 8/2006 | Ghandi |
| 7,089,307 B2 | 8/2006 | Zintel |
| 7,116,707 B1 * | 10/2006 | Armistead .................... 375/222 |
| 7,127,234 B2 | 10/2006 | Ishii |
| 7,130,895 B2 | 10/2006 | Zintel |
| 7,171,475 B2 | 1/2007 | Weisman |
| 7,181,620 B1 | 2/2007 | Hur |
| 7,197,297 B2 | 3/2007 | Myles |
| 7,234,063 B1 | 6/2007 | Baugher |
| 7,234,156 B2 | 6/2007 | French et al. |
| 7,263,076 B1 | 8/2007 | Leibovitz et al. |
| 7,292,870 B2 | 11/2007 | Heredia et al. |
| 7,363,354 B2 | 4/2008 | Lahti |
| 7,421,578 B1 | 9/2008 | Huang et al. |
| 7,477,894 B1 | 1/2009 | Sinha |
| 7,505,434 B1 | 3/2009 | Backes |
| 7,562,385 B2 | 7/2009 | Thione et al. |
| 7,565,529 B2 | 7/2009 | Beck |
| 7,599,380 B2 * | 10/2009 | Whitten ........................ 370/410 |
| 7,669,232 B2 | 2/2010 | Jou |
| 7,715,833 B2 | 5/2010 | Sanchez |
| 7,722,502 B2 | 5/2010 | Holkkola |
| 7,788,703 B2 | 8/2010 | Jou |
| 7,966,497 B2 | 6/2011 | Gantman et al. |
| 8,005,459 B2 | 8/2011 | Balsillie |
| 8,009,644 B2 | 8/2011 | Kuo |
| 8,091,120 B2 | 1/2012 | Perrella et al. |
| 8,108,904 B1 | 1/2012 | Chickering et al. |
| 8,260,278 B2 | 9/2012 | Landsman et al. |
| 8,272,036 B2 | 9/2012 | Jou |
| 8,355,912 B1 | 1/2013 | Keesey et al. |
| 8,605,697 B2 | 12/2013 | Kuo |
| 8,607,315 B2 | 12/2013 | Jou |
| 8,756,668 B2 | 6/2014 | Ranade et al. |
| 8,923,265 B2 | 12/2014 | Kuo |
| 9,071,583 B2 | 6/2015 | Yang |
| 9,092,610 B2 | 7/2015 | Sheu |
| 9,131,378 B2 | 9/2015 | Jou |
| 9,226,146 B2 | 12/2015 | Ranade et al. |
| 2002/0009199 A1 | 1/2002 | Ala-Laurila et al. |
| 2002/0022483 A1 | 2/2002 | Thompson et al. |
| 2002/0031130 A1 | 3/2002 | Tsuchiya |
| 2002/0047800 A1 | 4/2002 | Proctor |
| 2002/0080767 A1 | 6/2002 | Lee |
| 2002/0084942 A1 | 7/2002 | Tsai |
| 2002/0105471 A1 | 8/2002 | Kojima |
| 2002/0112058 A1 | 8/2002 | Weisman |
| 2002/0158798 A1 | 10/2002 | Chang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1 | 10/2003 | Anton et al. |
| 2003/0210207 A1 | 11/2003 | Suh |
| 2003/0227414 A1 | 12/2003 | Saliga |
| 2004/0014432 A1 | 1/2004 | Boyle |
| 2004/0017310 A1 | 1/2004 | Vargas-Hurlston |
| 2004/0017860 A1 | 1/2004 | Liu |
| 2004/0027291 A1 | 2/2004 | Zhang |
| 2004/0027304 A1 | 2/2004 | Chiang |
| 2004/0030900 A1 | 2/2004 | Clark |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0080455 A1 | 4/2004 | Lee |
| 2004/0095278 A1 | 5/2004 | Kanemoto |
| 2004/0097217 A1 | 5/2004 | McClain |
| 2004/0114535 A1 | 6/2004 | Hoffmann |
| 2004/0121749 A1 | 6/2004 | Cui et al. |
| 2004/0125777 A1 | 7/2004 | Doyle |
| 2004/0141617 A1 | 7/2004 | Volpano |
| 2004/0153647 A1 | 8/2004 | Rotholtz et al. |

(56) References Cited

U.S. PATENT DOCUMENTS

| | | |
|---|---|---|
| 2004/0190477 A1 | 9/2004 | Olson |
| 2004/0203593 A1 | 10/2004 | Whelan |
| 2004/0214570 A1 | 10/2004 | Zhang |
| 2004/0214572 A1 | 10/2004 | Thompson et al. |
| 2004/0260800 A1 | 12/2004 | Gu |
| 2005/0022210 A1 | 1/2005 | Zintel |
| 2005/0041739 A1 | 2/2005 | Li |
| 2005/0042988 A1 | 2/2005 | Hoek |
| 2005/0050352 A1 | 3/2005 | Narayanaswami et al. |
| 2005/0074018 A1 | 4/2005 | Zintel |
| 2005/0097503 A1 | 5/2005 | Zintel |
| 2005/0100166 A1 | 5/2005 | Smetters |
| 2005/0129222 A1 | 6/2005 | Creamer et al. |
| 2005/0135480 A1 | 6/2005 | Li |
| 2005/0138137 A1 | 6/2005 | Encamacion |
| 2005/0138193 A1 | 6/2005 | Encamacion |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |
| 2005/0222933 A1 | 10/2005 | Wesby |
| 2005/0228874 A1 | 10/2005 | Edgett |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Ghandi |
| 2005/0268107 A1 | 12/2005 | Harris |
| 2006/0007897 A1 | 1/2006 | Ishii |
| 2006/0031922 A1 | 2/2006 | Sakai |
| 2006/0039276 A1* | 2/2006 | Jain ............ H04L 1/22 370/218 |
| 2006/0046730 A1 | 3/2006 | Briancon et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0200851 A1 | 9/2006 | Hung |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227761 A1 | 10/2006 | Scott |
| 2006/0239369 A1 | 10/2006 | Lee |
| 2006/0251256 A1 | 11/2006 | Asokan et al. |
| 2006/0291434 A1 | 12/2006 | Gu |
| 2007/0025302 A1 | 2/2007 | Zhang et al. |
| 2007/0027622 A1 | 2/2007 | Cleron |
| 2007/0047449 A1 | 3/2007 | Berger et al. |
| 2007/0055752 A1 | 3/2007 | Wiegand et al. |
| 2007/0121525 A1 | 5/2007 | Jenster |
| 2007/0124490 A1 | 5/2007 | Kalavade et al. |
| 2007/0130294 A1 | 6/2007 | Nishio |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0165582 A1 | 7/2007 | Batta |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0293951 A1 | 12/2007 | Takahashi |
| 2007/0294528 A1 | 12/2007 | Shoji et al. |
| 2008/0060064 A1 | 3/2008 | Wynn et al. |
| 2008/0075280 A1 | 3/2008 | Ye et al. |
| 2008/0085723 A1 | 4/2008 | Tsao et al. |
| 2008/0089242 A1 | 4/2008 | Whitten |
| 2008/0109657 A1 | 5/2008 | Bajaj et al. |
| 2008/0119165 A1 | 5/2008 | Mittal et al. |
| 2008/0141244 A1 | 6/2008 | Kelley |
| 2008/0208617 A1 | 8/2008 | Onyon et al. |
| 2008/0212535 A1 | 9/2008 | Karaoguz et al. |
| 2008/0307515 A1 | 12/2008 | Drokov et al. |
| 2009/0005005 A1 | 1/2009 | Forstall et al. |
| 2009/0013210 A1* | 1/2009 | McIntosh et al. ............... 714/4 |
| 2009/0059288 A1 | 3/2009 | Mitsui |
| 2009/0092255 A1 | 4/2009 | Jou |
| 2009/0103731 A1 | 4/2009 | Sarikaya |
| 2009/0119190 A1 | 5/2009 | Realini |
| 2009/0187970 A1 | 7/2009 | Mower et al. |
| 2009/0193118 A1 | 7/2009 | Cox et al. |
| 2009/0217048 A1 | 8/2009 | Smith |
| 2010/0070542 A1 | 3/2010 | Feinsmith |
| 2010/0299518 A1 | 11/2010 | Viswanathan et al. |
| 2010/0332828 A1 | 12/2010 | Goto |
| 2011/0007705 A1 | 1/2011 | Buddhikot et al. |
| 2011/0035624 A1 | 2/2011 | Miller |
| 2011/0040870 A1 | 2/2011 | Wynn et al. |
| 2011/0047603 A1 | 2/2011 | Gordon et al. |
| 2011/0055898 A1 | 3/2011 | Jou |
| 2011/0126016 A1 | 5/2011 | Sun |
| 2011/0145593 A1 | 6/2011 | Auradkar et al. |
| 2011/0167478 A1 | 7/2011 | Krishnaswamy et al. |
| 2011/0208866 A1 | 8/2011 | Marmolejo-Meillon et al. |
| 2011/0246765 A1 | 10/2011 | Schibuk |
| 2011/0264906 A1 | 10/2011 | Pourzandi et al. |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0078949 A1 | 3/2012 | Allen et al. |
| 2012/0089845 A1 | 4/2012 | Raleigh |
| 2012/0134291 A1 | 5/2012 | Raleigh |
| 2012/0257536 A1 | 10/2012 | Kholaif et al. |
| 2012/0284785 A1 | 11/2012 | Salkintzis et al. |
| 2012/0317625 A1 | 12/2012 | Jou |
| 2012/0322035 A1 | 12/2012 | Julia et al. |
| 2013/0007853 A1 | 1/2013 | Gupta et al. |
| 2013/0047218 A1 | 2/2013 | Smith |
| 2013/0111217 A1 | 5/2013 | Kopasz et al. |
| 2013/0173916 A1 | 7/2013 | Sato |
| 2013/0182693 A1 | 7/2013 | Sperling et al. |
| 2013/0223222 A1 | 8/2013 | Kotecha et al. |
| 2013/0269008 A1 | 10/2013 | Shtrom |
| 2014/0007209 A1 | 1/2014 | Zucker |
| 2014/0066112 A1 | 3/2014 | Kuo |
| 2014/0068724 A1 | 3/2014 | Jou |
| 2014/0282951 A1 | 9/2014 | Ranade |
| 2015/0133089 A1 | 5/2015 | Kuo |
| 2015/0257009 A1 | 9/2015 | Sheu |
| 2015/0296377 A1 | 10/2015 | Sheu |

FOREIGN PATENT DOCUMENTS

| | | |
|---|---|---|
| CN | 103441984 | 12/2013 |
| CN | 103858106 | 6/2014 |
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 638 261 | 3/2006 |
| EP | 1 724 691 | 11/2006 |
| EP | 2 705 429 | 3/2014 |
| EP | 1 958 369 | 4/2015 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |

(56) References Cited

FOREIGN PATENT DOCUMENTS

| | | |
|---|---|---|
| JP | 2014-522142 | 8/2014 |
| TW | 201146029 A1 | 12/2011 |
| TW | 201351188 | 12/2013 |
| WO | WO 01/84323 | 11/2001 |
| WO | WO 02/25967 | 3/2002 |
| WO | WO 03/079484 | 9/2003 |
| WO | WO 2007/064822 | 6/2007 |
| WO | WO 2007/127120 | 11/2007 |
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

U.S. Appl. No. 13/191,383, Office Action dated Jul. 22, 2013.
U.S. Appl. No. 13/590,997, Office Action dated Jul. 18, 2013.
Aboba, Bernard "Virtual Access Points," IEEEP802.11 Wireless LANs, XX, XX, No. 802.11-03/154rl, May 22, 2003.
Areg Alimian et al., "Analysis of Roaming Techniques," doc.:IEEE 802.11-04/0377r1, Submission, Mar. 2004.
Chang, Nicholas B. et al., "Optimal Channel Probing and Transmission Scheduling for Opportunistics Spectrum Access," Sep. 2007.
Cisco Systems, "Cisco Aironet Access Point Software Configuration Guide: Configuring Filters and Quality of Service," Aug. 2003.
Dell Inc., "How Much Broadcast and Multicast Traffic Should I Allow in My Network," PowerConnect Application Note #5, Nov. 2003.
Dunkels, Adam et al., "Connecting Wireless Sensornets with TCP/IP Networks," Proc. of the 2d Int'l Conf. on Wired Networks, Frankfurt, Feb. 2004.
Dunkels, Adam et al., "Making TCP/IP Viable for Wireless Sensor Networks," Proc. of the 1st Euro. Workshop on Wireless Sensor Networks, Berlin, Jan. 2004.
Dutta, Ashutosh et al., "MarconiNet Supporting Streaming Media Over Localized Wireless Multicast," Proc. of the 2d Int'l Workshop on Mobile Commerce, 2002.
Festag, Andreas, "What is MOMBASA?" Telecommunication Networks Group (TKN), Technical University of Berlin, Mar. 7, 2002.
Golmie, Nada, "Coexistence in Wireless Networks: Challenges and System-Level Solutions in the Unlicensed Bands," Cambridge University Press, 2006.
Hewlett Packard, "HP ProCurve Networking: Enterprise Wireless LAN Networking and Mobility Solutions," 2003.
Hirayama, Koji et al., "Next-Generation Mobile-Access IP Network," Hitachi Review vol. 49, No. 4, 2000.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
Information Society Technologies Ultrawaves, "System Concept / Architecture Design and Communication Stack Requirement Document," Feb. 23, 2004.
Keidl et al., TES2003, LNCS v. 2819, pp. 104-118, Sep. 2003.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Mawa, Rakesh, "Power Control in 3G Systems," Hughes Systique Corporation, Jun. 28, 2006.
Microsoft Corporation, "IEEE 802.11 Networks and Windows XP," Windows Hardware Developer Central, Dec. 4, 2001.
Pat Calhoun et al., "802.11r strengthens wireless voice," Technology Update, Network World, Aug. 22, 2005, http://www.networkworld.com/news/tech/2005/082208techupdate.html.
Steger, Christopher et al., "Performance of IEEE 802.11b Wireless LAN in an Emulated Mobile Channel," 2003.
Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Extended European Search Report for EP application No. 07755678.5 dated Dec. 29, 2011.
Extended European Search Report for EP application No. 06838713.3 dated Jul. 13, 2011.
PCT Application No. PCT/US2006/045893, International Search Report and Written Opinion dated Sep. 25, 2007.
PCT Application No. PCT/US2007/09836, International Search Report and Written Opinion dated Sep. 12, 2008.
PCT Application No. PCT/US2007/09503, International Search Report and Written Opinion dated Mar. 3, 2008.
PCT Application No. PCT/US2012/036028, International Search Report and Written Opinion dated Aug. 7, 2012.
Chinese Office Action for CN Application No. 200680045272.7 dated Jul. 12, 2011.
Chinese Office Action for CN Application No. 200680045272.7 dated Feb. 1, 2011.
Chinese Office Action for CN Application No. 200680045272.7 dated Jul. 15, 2010.
Chinese Office Action for CN Application No. 200780019074.8 dated Jun. 15, 2011.
Chinese Office Action for CN Application No. 200780019389.2 dated Sep. 12, 2012.
Chinese Office Action for CN Application No. 200780019389.2 dated Feb. 14, 2012.
Chinese Office Action for CN Application No. 200780019389.2 dated Apr. 8, 2011.
European First Examination Report for EP Application No. 068387133 dated Apr. 3, 2012.
European First Examination Report for EP Application No. 07755678.5 dated Oct. 23, 2012.
U.S. Appl. No. 11/607,619, Office Action dated Oct. 13, 2010.
U.S. Appl. No. 11/607,619, Final Office Action dated Dec. 4, 2009.
U.S. Appl. No. 11/607,619, Office Action dated Apr. 29, 2009.
U.S. Appl. No. 11/788,371, Final Office Action dated Jan. 21, 2010.
U.S. Appl. No. 11/788,371, Office Action dated Sep. 17, 2009.
U.S. Appl. No. 11/789,446, Final Office Action dated Oct. 13, 2010.
U.S. Appl. No. 11/789,446, Office Action dated May 24, 2010.
U.S. Appl. No. 11/789,446, Final Office Action dated Jun. 24, 2009.
U.S. Appl. No. 11/789,446, Office Action dated Sep. 3, 2008.
U.S. Appl. No. 12/339,688, Office Action dated Sep. 15, 2009.
U.S. Appl. No. 12/845,089, Final Office Action dated Feb. 14, 2012.
U.S. Appl. No. 12/845,089, Office Action dated Sep. 6, 2011.
Supplementary European Search Report for EP application No. 07755678.5 dated Jan. 17, 2012.
Chinese Office Action for CN Application No. 200680045272.7 dated Jul. 29, 2013.
European First Examination Report for EP Application No. 07755913.6 dated Jul. 4, 2013.
IEEE Trial-Use Recommended Practice for Multi-Vendor Access Point Interoperability Via an Inter-Access Point Protocol Across Distribution Systems Supporting IEEE 802.11 Operation; IEEE Std 802.11F-2003 ED, IEEE Standard, IEEE, Piscataway, NJ, USA, Jan. 1, 2003, pp. 1-67.
Yang, Song Li, Virtual AP for 802.11 Seamless Handoff draft-song-80211-seamless-handoff-00.txt.
Extended European Search Report for EP application No. 14163071.5 dated Jul. 4, 2014.
Extended European Search Report for EP application No. 12779857.7 dated Mar. 30, 2015.

(56) References Cited

OTHER PUBLICATIONS

U.S. Appl. No. 14/078,947, Office Action dated Sep. 24, 2014.
European Second Examination Report for EP Application No. 07755678.5 dated Feb. 3, 2014.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Encrypted Preshared key; cisco corp. 14 pages, 2010 (Date of Download: Nov. 20, 2013).
Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.
PCT Application No. PCT/US2013/34997, International Search Report dated Jun. 17, 2013.
PCT Application No. PCT/US2013/34997, Written Opinion dated Jun. 17, 2013 (Date of Online Publication: Oct. 4, 2014).
Chinese Office Action for CN Application No. 200680045272.7 dated Oct. 27, 2011.
U.S. Appl. No. 14/078,947, Final Office Action dated Feb. 23, 2015.
U.S. Appl. No. 13/370,201, Office Action dated May 13, 2013.
U.S. Appl. No. 14/294,012, Office Action dated Mar. 23, 2015.
U.S. Appl. No. 13/439,844, Office Action dated Apr. 22, 2014.
U.S. Appl. No. 13/439,844, Final Office Action dated Oct. 28, 2013.
U.S. Appl. No. 13/439,844, Office Action dated Jun. 5, 2013.
EPO Communication under Rule 71(3) EPC Intention to Grant for related EP Application No. 12779857.7, dated Dec. 3, 2015 (7 sheets).
Notice of Allowance for co-pending U.S. Appl. No. 14/586,396, dated Dec. 4, 2015 (16 sheets).
SIPO Office Action for co-pending Chinese Application No. 201310291285.4, dated Jan. 4, 2016 (16 sheets).
Office Action for co-pending U.S. Appl. No. 14/692,485, dated Feb. 16, 2016 (22 sheets).
EPO Communication under Rule 71(3) EPC Intention to Grant for co-pending EP Application No. 07755678.5, dated Feb. 17, 2016 (7 sheets).
JPO Office Action for corresponding Japanese Application No. 2014-509367, dated Mar. 8, 2016 (5 sheets).
Office Action for co-pending U.S. Appl. No. 14/981,579, dated Jun. 17, 2016 (33 sheets).
Chinese Office Action for CN Application No. 201280021332.7 dated Dec. 11, 2015.
U.S. Appl. No. 14/751,833, Ming-Jye Sheu, Sharing Security Keys With Headless Devices, filed Jun. 26, 2015.
U.S. Appl. No. 14/981,579, Prashant Ranade, Dynamic PSK for Hotspots, filed Dec. 28, 2015.
TIPO Office Action for related Taiwanese Application No. 102112203, dated Aug. 29, 2016 (12 sheets).

\* cited by examiner

REMOTE CABLE ACCESS POINT RESET

CROSS-REFERENCE TO RELATED APPLICATIONS

This application claims the priority benefit of U.S. Provisional Application Ser. No. 61/481,203, titled "Remote Cable Access Point Reset," filed May 1, 2011, the disclosure of which is incorporated herein by reference.

BACKGROUND OF THE INVENTION

The World Wide Web has expanded to provide web services to many consumers. Many businesses provide a web service such as Wi-Fi for their employees and customers use. The web service may allow employees greater freedom and efficiency to access company assets and perform their jobs. Providing a web service to customers may allow for more efficient business transactions with the company.

Providing a reliable web service for employees and customers is important to may businesses. As such, it is useful to know when a web service has failed. When a failure has been detected, it is important to restore service to the web service as soon as possible.

There is a need in the art for providing improved web service maintenance and repair.

SUMMARY OF THE CLAIMED INVENTION

The present technology monitors a wireless device, detects when the device has failed or is not operating properly, and is able to remotely reset the device. The device may be reset remotely without a technician required to physically attend to the device. This out of band management allows for quicker, cheaper and more efficient handling of undesired states of a device, such as failure to operate. For a modem, the system may detect that the modem is not broadcasting a signal or is not communicating with the Internet or other network. The reset may be implemented through an access point in communication with the malfunctioning modem. For an access point, the system may detect that the access point is not communicating with a modem or another access point. The reset may be implemented by a neighboring access point or modem.

An embodiment may include a method for rebooting a remote device. An indication of a service failure may be received for a remote device. The indication may be received from a second device in communication with the remote device. A reboot command may be transmitted to the second device. The reboot command may be executable by the second device to cause the second device to initiate a reboot in the remote device. An embodiment may include a computer readable storage medium having executable instructions which, when executed by a processor, perform the method of rebooting a remote device.

An embodiment may include a system having a processor, memory, and one or more modules stored in memory. The one or more modules may be executable to receive an indication of a service failure for the remote device. The indication may be received from a second device in communication with the remote device. The one or more modules may further be executable to transmit a reboot command to the second device. The reboot command may be executable by the second device to cause the second device to initiate a reboot in the remote device.

An embodiment may include a method for rebooting a cable modem. An access point may detect a cable modem has failed. An indication of the cable modem failure may be transmitted to a remote device by the access point. A reboot command for the cable modem may be received by the access point from the remote device. Reboot of the cable modem may be initialized by the access point.

DETAILED DESCRIPTION

The present technology monitors a wireless device, detects when the device has failed or is not operating properly, and is able to remotely reset the device. The device may be reset remotely without a technician required to physically attend to the device. This out of band management allows for quicker, cheaper and more efficient handling of undesired states of a device, such as failure to operate. For a modem, the system may detect that the modem is not broadcasting a signal or is not communicating with the Internet or other network. The reset may be implemented through an access point in communication with the malfunctioning modem. For an access point, the system may detect that the access point is not communicating with a modem or another access point. The reset may be implemented by a neighboring access point or modem.

In some environments, a plurality of access points may be used to provide a wireless signals to an extended area. The plurality of access points may be used with one or more modems, such as a cable modem, and form a "mesh" of wireless signals.

Figure 1:
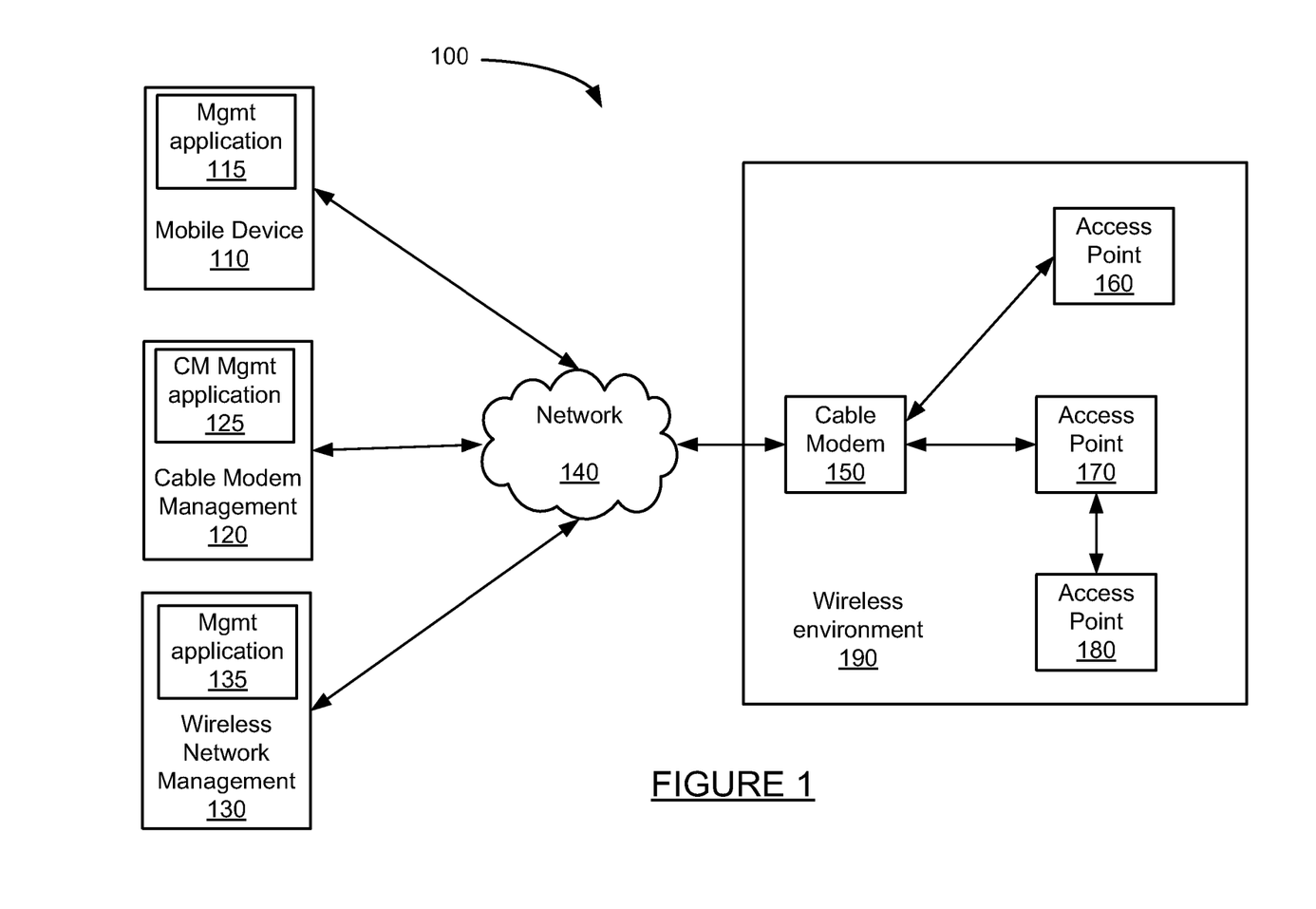
FIG. 1 is a block diagram of an exemplary system for remotely resetting a wireless device.

FIG. 1 is a block diagram of an exemplary system for remotely resetting a wireless device. FIG. 1 includes mobile device 110, cable modem management sever 120, and wireless network management server 130. Each of mobile device 110 and servers 120 and 130 communicate with network 140.

Wireless network management server 130 may be implemented as one or more servers and machines, including one or more network servers, application servers, work stations, a combination of these or one or more other computing devices. Sever 130 may communicate and control one or more access points 160, 170 and 190, as well as cable modem 150. In some embodiments, management application 135, stored in memory and executable by a processor of wireless network management server 130, may manage communications with access point 170. Application 115 communications may include receiving status updates and pings from an access point, receiving fail-over messages from an access point, transmitting cable modem reset command to an access point in direct or indirect communication with the cable modem, and other communication. Application 115 may also provide an interface which provides information for one or more access points and cable modems. The interface may be updated periodically based on information received from an access point or cable modem and may be provided to an administrator. The interface may also receive input from an administrator regarding the management of the one or more access points and cable modem.

Mobile device 110 may be implemented as a smart phone, notebook computer, net book computer, a tablet computer, or other mobile computing device. Mobile device 110 may include management application 115, stored in mobile device memory and executable by a mobile device processor. When executed, management application 115 may perform operations similar to that of management application 135 of wireless network management server 130. For example, management application 115 may communicate with and manage cable modem 150 and one or more access points 160-180 through network 140. In some embodiments, management application 115 may receive messages originating from an access point 170 and communicated through cable modem 150, such as for example message indicating the status of the particular access point, another access point or the cable modem, a fail-over message, or other information. Management application 115 may also transmit information to cable modem 150, an access point 170 in direct communication with cable modem 150 or an access point in indirect communication with cable modem 150. The information may include a status request, reset request, or other information.

Cable modem management 120 may be implemented as one or more servers and machines, including one or more network servers, application servers, work stations, a combination of these or one or more other computing devices. Cable modem management 120 may include management application 125, which may be stored in cable modem management memory and executable by a cable modem management processor. When executed, the management application 125 may communicate with and manage cable modem 150. In some embodiments, management application 125 may reset cable modem 150, adjust settings and parameters of cable modem 150, control cable modem 150 communication with an access point, and perform other functions.

Network 140 may facilitate communication of data between different servers, devices and machines. The network may be implemented as a private network, public network, intranet, the Internet, or a combination of these networks.

Cable modem 150 and access points 160, 170 and 180 are included within a wireless environment 190. Cable modem 150 may communicate with network 140 and provide network access to access points 160-180. When network 140 is the Internet, cable modem 150 may provide internet access through access points 160-180. Through described herein as a cable modem, it is intended that other types of communication devices may be used interchangeably with a cable modem, such as for example, another access point, point to point link, macro or micro cellular backhaul, and so forth.

Access points 160-180 may directly or indirectly communicate with cable modem 150. For example, access points 160 and 170 directly receive a signal from cable modem 150 and broadcast a signal within wireless environment 190. Access point 180 receives a network signal from access point 170 rather than directly from cable modem 150. In some embodiments, a plurality of access points may be chained together to provided an extended signal coverage area within wireless environment 190.

Some access points may be in communication with more than one cable modem (not illustrated in FIG. 190). In some embodiments, when a cable modem 150 fails, an access point in communication with network 150 through modem 150 may "fail-over" to second cable modem. The second cable modem may be in direct communication or indirect communication with the access point when the access point "fails over" and communicates with network 140 via the second cable modem.

When an access point fails-over due to a failed cable modem, the access point may send a message to management application 135 of wireless network management 130. The message may indicate that the access point failed-over, the access point identify, the cable modem that failed and the cable modem now working with the access point, and other data. The management application 135 may receive the message and instruct the access point to reset the failed cable modem.

A failed over access point may restart a failed cable modem in many ways. In some embodiments, the access point may transmit a wireless signal to the cable modem that causes a reset. Alternatively, the access point may communicate with the modem via WiFi or a wired signal. The wireless signal may be a radio frequency signal, and optical signal, IR signal, or some other wireless signal. For example, the access point and cable modem may be configured to communicate via Bluetooth, and the reset command may be sent from the access point to the cable modem via Bluetooth message. In some embodiments, the failed over access point may restart the failed cable modem using a wired connection. In some embodiments, the failed cable modem and access point may share a wired connection. In some embodiments, the failed-over access point may transmit a reset command or other message to failed cable modem via power line communication. Power line communication may be configured between devices that are powered by the same electric power transmission system.

In some embodiments, the reset of a cable modem may be configurable. For example, communication between an access point and cable modem may be secure. The cable modem operator and access point operator may be different entities, and the operator of one may not want to provide a publicly accessible way to access their device. Communications between an access point and a cable modem may be secured by providing a layer two Ethernet level solution via a VLAN such that only known VLANs may be connected. Alternatively, a secure tunnel may be established between the access point and the cable modem. In embodiments, the communication may also be secured by use of encryption.

In some embodiments, such as a mesh configuration, different access points may be a master device and some access points and cable modems may be slaves. In this case, a master access point may transmit a beacon signal to a slave cable modem or access point only when a "send reset command" message is received from a management application 135 or 115.

A reset command may be sent to an access point to reset a cable modem remotely from over network 140 or locally. For example, an administrator may be within the wireless environment 190 to provide the reset command to an access point via mobile device 110. In this scenario, mobile device 110 may be brought within range of an access point, whether within the same room, the same building, or outside the building but within range of an access point. The operation status of the cable modem may be supplied by the access point to the mobile device, which can either wait for user's input to trigger a reset or automatically trigger a reset based on some pre-defined set of conditions (e.g., an outage time threshold) and/or policies (e.g., user with certain credential that is provided to the access point). The command can then be provided by mobile device 110 to reset the cable modem. Though not provided over network 140, providing a reset command from within the wireless environment may still be more efficient than getting within a few feet of cable modem 150 and physically initiating a reset operation.

Figure 2:
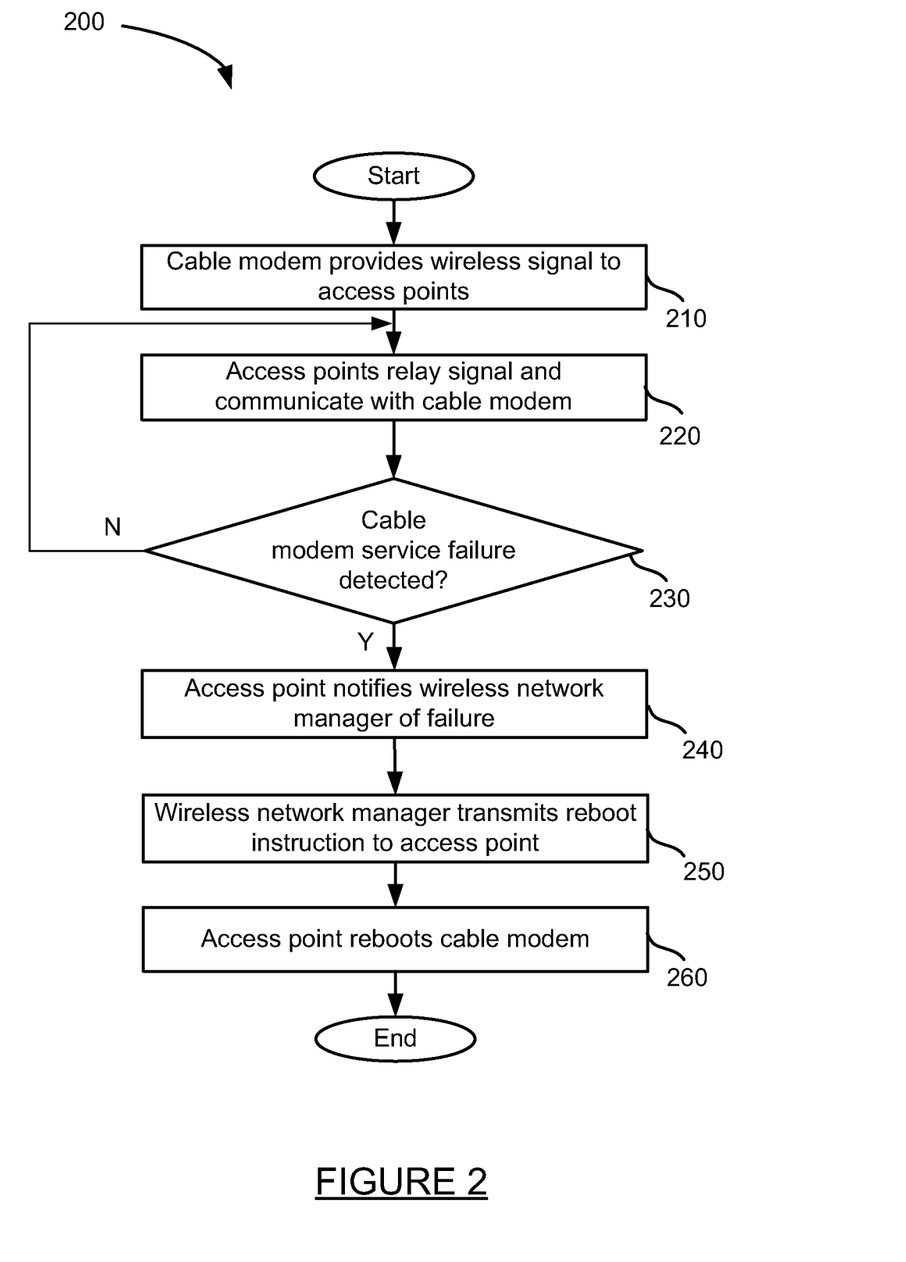
FIG. 2 is a flow chart of an exemplary method for remotely resetting a cable modem.

FIG. 2 is a flow chart of an exemplary method for remotely resetting a cable modem. Cable modem 150 provides a wireless signal to one or more access points 160-180 directly or indirectly, at step 210. Access points 160-180 relay the signal and communicate with the cable modem at step 220. The cable modem 150 and access points 160-180 provide wireless signals that create wireless environment 190. Access points may communicate with wireless signal compatible devices, such as wireless computers and smart phones with wi-fi capability, within wireless environment 190 and facilitate communication between the wireless signal compatible devices and network 140.

A determination is made as to whether cable modem 150 is detected to fail at step 230. The cable modem may be detected to fail by periodically communicating with an external machine or gateway via the cable modem 150. Detecting cable modem failure is discussed in more detail with respect to the method of FIG. 3.

If cable modem is operational, the method of FIG. 2 returns to step 220. If the cable modem is detected to have failed, an access point notifies wireless network manager 135 of the cable modem failure at step 240. Notification by an access point may include a fail-over by the access point from the failed cable modem to an alternate cable modem that is operation and communicates with network 140. The communication with the alternate cable modem may be a direct communication or indirect communication via one or more intervening access points. In some embodiments, the failed over access point may notify cable modem management application 125 of the failure, and application 125 will instruct the access point how to proceed. For purposes of discussion, method 200 will be discussed in the context of communication with wireless network manager 135.

In some embodiments, an administrator may diagnose the cable modem from the wireless network manager 135 via an access point 170. The administrator may use the connectivity provided by the failover link to remotely login to the cable modem and verify its status, retrieve support information, and troubleshoot cause of failure. This process of retrieving information can also be automated by a manager application to retrieve support information as well as access point and cable modem status to help determine the cause of failure.

Wireless network manager 135 (or 115) receives the failure status message from the access point and transmits a reboot (or reset) instruction to the access point at step 250. The message may be sent from the wireless network manager through network 140 and the alternate cable modem through which the access point is communicating with network 140.

The access point receives the message and reboots (resets) cable modem at step 260. The reboot command may be sent via a wireless signal, such as a Bluetooth signal, or a wired signal such as a power line communication signal.

In some embodiments, it may be preferable to not immediately reset the modem to restore the original service level, but rather to diagnose the cause of failure. To limit service outage, a wireless service may be provided by the secondary access point while technicians conduct their troubleshooting work.

Figure 3:
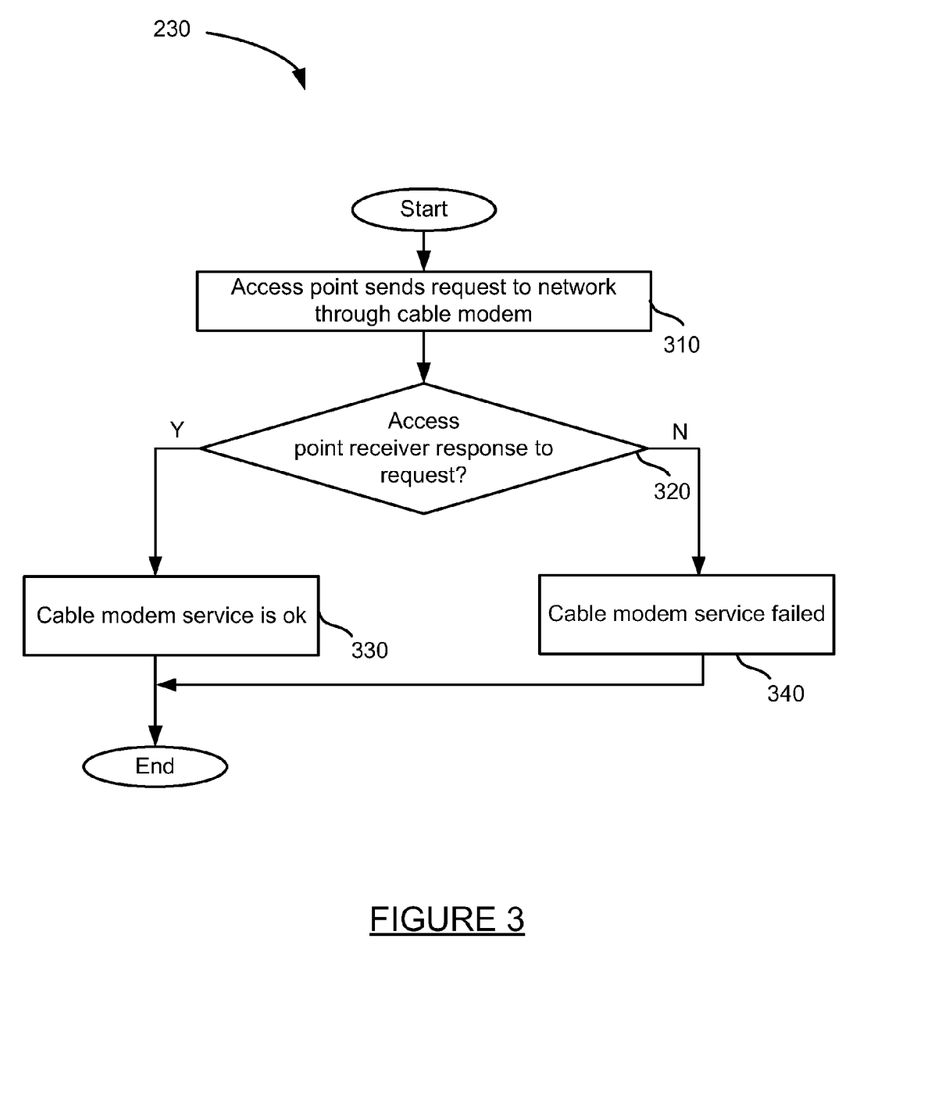
FIG. 3 is a flow chart of an exemplary method for detecting cable modem service failure.

FIG. 3 is a flow chart of an exemplary method for detecting cable modem service failure. The method of FIG. 3 provides more detail for step 230 of the method of FIG. 2. An access point transmits a request to a network through a cable modem at step 310. The request may be to any anchor located over the network. For example, the request may be made to a network gateway as a ping, or some other simple request. A determination is made as to whether the access point receives a response to the request at step 320. The access point may wait a period of time before determining a time-out has occurred, or may receive a failed request message from the cable modem.

If a response is received by the access point, the cable modem service is determined to be operation at step 330. If a response is not received by the access point at step 320, the cable modem service is determined have failed at step 340.

Figure 4:
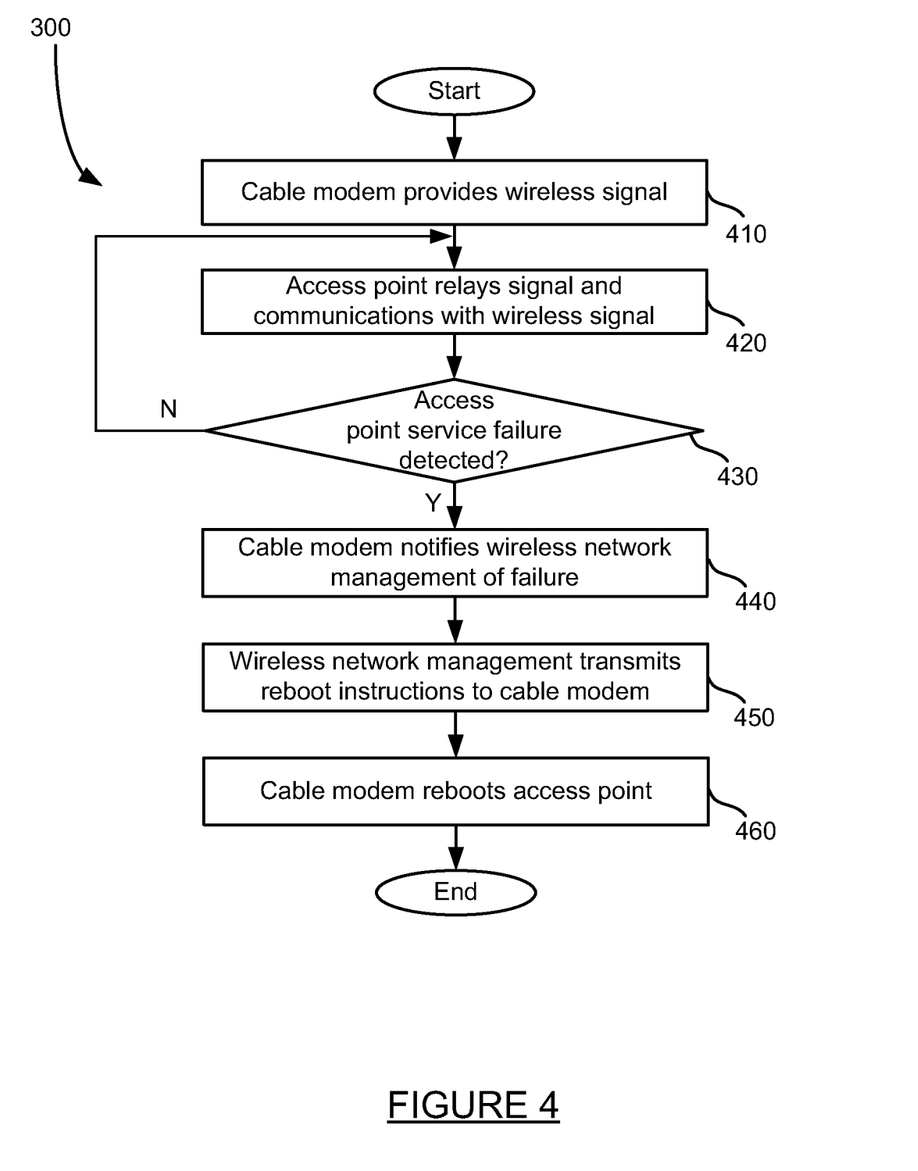
FIG. 4 is a flow chart of an exemplary method for remotely resetting an access point.

In some embodiments, an access point may malfunction or fail. In this scenario, the access point may be reboot or reset similarly to reset of a cable modem. FIG. 4 is a flow chart of an exemplary method for remotely resetting an access point. Cable modem 150 provides a wireless signal to one or more access points 160-180 directly or indirectly, at step 210. Access points 160-180 relay the signal and communicate with the cable modem at step 220. The cable modem 150 and access points 160-180 provide wireless signals that create wireless environment 190.

A determination is made at step 430 as to whether the access point has failed. Access point failure may be detected by another access point in communication with the failed access point or a cable modem. For example, a cable modem may ping each access point in direct or indirect communication with the cable modem. An access point may be determined to fail when it does not respond to the ping or provides an error message in response to the ping. If access point failure is not detected, the method returns to step 420.

If access point failure is detected, the cable modem notifies the wireless network management application 135 (or 115) of the failed access point at step 440. The wireless network management application transmits a reboot instruction to the cable modem at step 450. The cable modem may reboot the access point at step 460. In some embodiments, the wireless network management application transmits a failure notice to cable modem management application 125, which in turn transmits an access point reboot command to cable modem 460.

Figure 5:
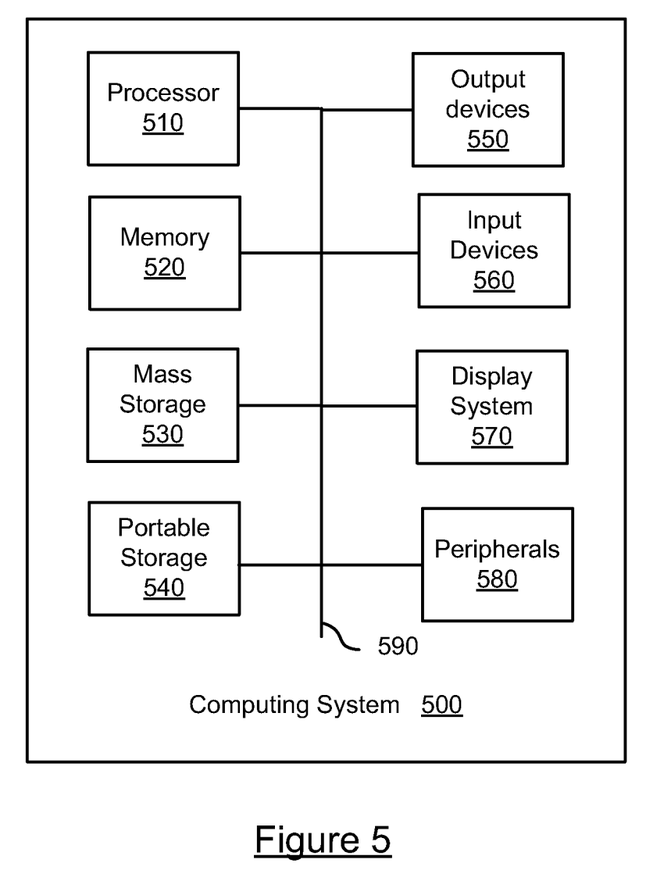
FIG. 5 is a block diagram of an exemplary system for implementing a computing device.

FIG. 5 illustrates an exemplary computing system 500 that may be used to implement a computing device for use with the present technology. System 500 of FIG. 5 may be implemented in the contexts of the likes of cable modem management server 120, wireless network management server 130, and access points 160-180. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 6:
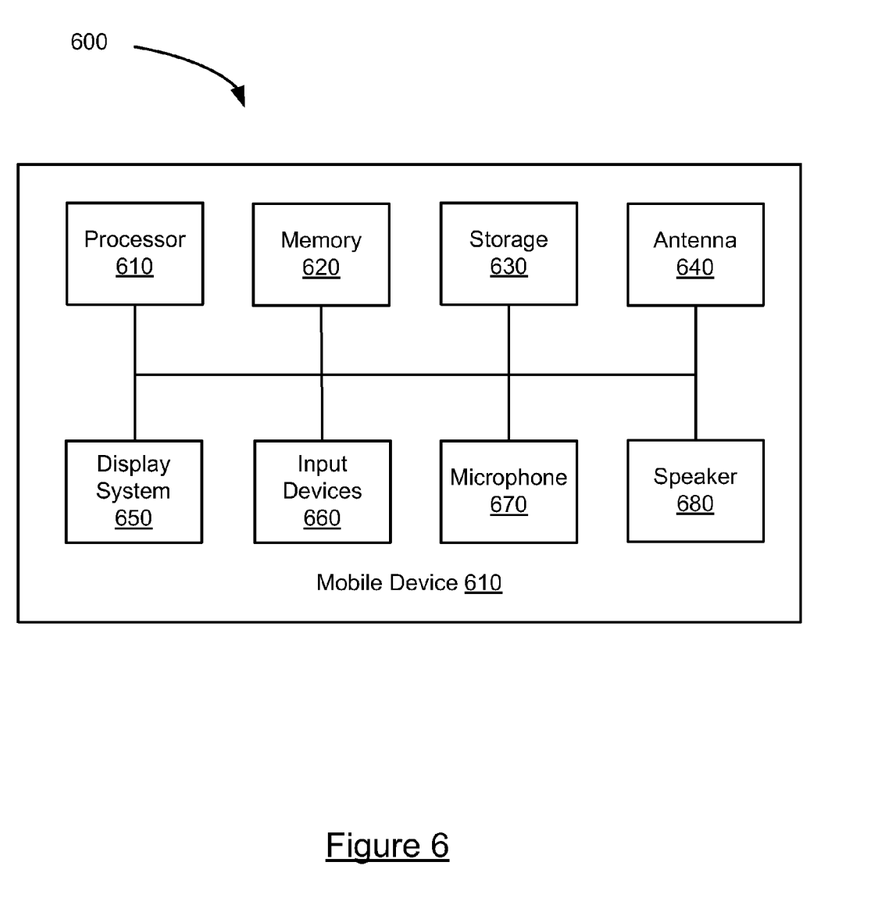
FIG. 6 is a block diagram of an exemplary system for implementing a mobile device.

FIG. 6 is a block diagram of an exemplary system for implementing a mobile device for use with the present technology, such as for mobile device 110. The mobile device 600 of FIG. 6 includes one or more processors 610 and memory 660. Memory 660 stores, in part, programs, instructions and data for execution and processing by processor 610. The system 600 of FIG. 6 further includes storage 630, one or more antennas 640, a display system 650, inputs 660, one or more microphones 670, and one or more speakers 680.

The components shown in FIG. 6 are depicted as being connected via a single bus 626. However, the components 610-680 may be connected through one or more data transport means. For example, processor unit 610 and main memory 660 may be connected via a local microprocessor bus, and storage 630, display system 650, input 660, and microphone 670 and speaker 680 may be connected via one or more input/output (I/O) buses.

Memory 660 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 660 can store the system software for implementing embodiments of the present invention for purposes of loading that software into main memory 610.

Antenna 640 may include one or more antennas for communicating wirelessly with another device. Antenna 640 may be used, for example, to communicate wirelessly via Wi-Fi, Bluetooth, with a cellular network, or with other wireless protocols and systems. The one or more antennas may be controlled by a processor 610, which may include a controller, to transmit and receive wireless signals. For example, processor 610 execute programs stored in memory 660 to control antenna 640 transmit a wireless signal to a cellular network and receive a wireless signal from a cellular network.

Display system 650 may include a liquid crystal display (LCD), a touch screen display, or other suitable display device. Display system 670 may be controlled to display textual and graphical information and output to text and graphics through a display device. When implemented with a touch screen display, the display system may receive input and transmit the input to processor 610 and memory 660.

Input devices 660 provide a portion of a user interface. Input devices 660 may include an alpha-numeric keypad, such as a keyboard, for inputting alpha-numeric and other information, buttons or switches, a trackball, stylus, or cursor direction keys.

Microphone 670 may include one or more microphone devices which transmit captured acoustic signals to processor 610 and memory 660. The acoustic signals may be processed to transmit over a network via antenna 640.

Speaker 680 may provide an audio output for mobile device 600. For example, a signal received at antenna 640 may be processed by a program stored in memory 660 and executed by processor 610. The output of the executed program may be provided to speaker 680 which provides audio. Additionally, processor 610 may generate an audio signal, for example an audible alert, and output the audible alert through speaker 680.

The mobile device system 600 as shown in FIG. 6 may include devices and components in addition to those illustrated in FIG. 6. For example, mobile device system 600 may include an additional network interface such as a universal serial bus (USB) port.

The components contained in the computer system 600 of FIG. 6 are those typically found in mobile device systems that may be suitable for use with embodiments of the present invention and are intended to represent a broad category of such mobile device components that are well known in the art. Thus, the computer system 600 of FIG. 6 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for rebooting a first cable modem by a wireless access point, the method comprising:
   detecting, by the wireless access point, a service failure of the first cable modem, in response to not receiving a response, or receiving a failed request message, from the first cable modem to a request sent by the wireless access point;
   generating, by the wireless access point, an indication of the service failure of the first cable modem, the indication being adapted for transmission to a management device; and
   in response to receiving a reboot command from the management device at the wireless access point, generating a wireless command signal for wireless transmission by the wireless access point, the wireless command signal being adapted to cause the first cable modem to reboot in response to wirelessly receiving the wireless command signal.

2. The method of claim 1, wherein the wireless command signal is adapted for transmission to the first cable modem through a second access point.

3. The method of claim 1, wherein the indication is adapted for transmission to the management device via a second cable modem.

4. The method of claim 1, wherein the indication includes status information of the first cable modem.

5. The method of claim 1, wherein the indication is adapted to be received by an application on the management device, the management device being a wireless device.

6. The method of claim 1, wherein the wireless command signal is adapted for transmission to the first cable modem via a secure communication channel between the wireless access point and the first cable modem.

7. The method of claim 1, wherein the indication is adapted for transmission to the management device via the internet, the management device being a remote server.

8. The method of claim 1, further comprising:
   failing over, by the wireless access point, to a second cable modem until the first cable modem resumes operation after rebooting.

9. A non-transitory computer readable storage medium having embodied thereon a program, the program being executable by a processor to perform a method for rebooting a first cable modem, the method comprising:
   receiving an indication of a service failure of the first cable modem, the indication being received from a wireless access point in communication with the first cable modem, the service failure detected following an absence of a response by the first cable modem to a request sent by the wireless access point; and
   generating a reboot command for transmission to the wireless access point, the reboot command being executable by the wireless access point to transmit a wireless command signal to the first cable modem, the wireless command signal being adapted to cause the first cable modem to reboot in response to wirelessly receiving the wireless command signal.

10. The non-transitory computer readable storage medium of claim 9, wherein the reboot command is adapted for transmission to the wireless access point through a second access point.

11. The non-transitory computer readable storage medium of claim 9, wherein the indication is received from the wireless access point via a second cable modem.

12. The non-transitory computer readable storage medium of claim 9, wherein the wireless command signal is adapted for transmission to the first cable modem via a secure communication channel between the wireless access point and the first cable modem.

13. The non-transitory computer readable storage medium of claim 9, wherein the reboot command is adapted for transmission to the wireless access point via the internet.

14. The non-transitory computer readable storage medium of claim 9, wherein the reboot command is executable by the wireless access point to further fail over the wireless access point to a second cable modem until the first cable modem resumes operation after rebooting.

15. A system for rebooting a first cable modem, the system comprising:
   a processor;
   a memory; and
   one or more modules stored in the memory and executable by the processor to:
      receive an indication of a service failure of the first cable modem, the indication received from a wireless access point in communication with the first cable modem, the service failure detected following an absence of a response by the first cable modem to a request sent by the wireless access point; and
      generate a reboot command for transmission to the wireless access point, the reboot command being executable by the wireless access point to transmit a wireless command signal to the first cable modem, the wireless command signal being adapted to cause the first cable modem to reboot in response to wirelessly receiving the wireless command signal.

16. The system of claim 15, wherein the indication is received from the wireless access point via a second cable modem.

17. The system of claim 15, wherein the reboot command is executable by the wireless access point to further fail over the wireless access point to a second cable modem until the first cable modem resumes operation after rebooting.

18. A method for rebooting a first cable modem by an access point, the method comprising:
   detecting a service failure of the first cable modem by the access point;
   generating, by the access point, an indication of the service failure of the first cable modem, the indication of the service failure being adapted for transmission to a remote device;
   in response to receiving, at the access point, a reboot command from the remote device,
   generating a wireless command signal for transmission to the first cable modem, the wireless command signal being adapted to cause the first cable modem to reboot,
   failing over, by the access point, to a second cable modem until the first cable modem reboots in response to wirelessly receiving the wireless command signal.

19. The method of claim 18, wherein the indication and the reboot command are adapted for transmission through the second cable modem.

20. The method of claim 18, wherein the remote device is a mobile device and the reboot command is a Wi-Fi compliant signal.

\* \* \* \* \*